US012580435B2

(12) United States Patent
Clough et al.

(10) Patent No.: US 12,580,435 B2
(45) Date of Patent: Mar. 17, 2026

(54) SELECTIVE PERMEABILITY ROTOR SLEEVE FOR INTERIOR PERMANENT MAGNET MACHINE

(71) Applicant: GM Global Technology Operations LLC, Detroit, MI (US)

(72) Inventors: Eric C Clough, Santa Monica, CA (US); Alireza Fatemi, Canton, MI (US); Thomas W Nehl, Shelby Township, MI (US); David A. Smith, Newbury Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 18/509,906

(22) Filed: Nov. 15, 2023

(65) Prior Publication Data

US 2025/0158464 A1     May 15, 2025

(51) Int. Cl.
| | |
|---|---|
| *H02K 1/27* | (2022.01) |
| *H02K 1/276* | (2022.01) |
| *H02K 1/28* | (2006.01) |
| *H02K 21/14* | (2006.01) |

(52) U.S. Cl.
CPC .............. *H02K 1/28* (2013.01); *H02K 1/276* (2013.01); *H02K 21/14* (2013.01)

(58) Field of Classification Search
CPC .......... H02K 1/28; H02K 1/276; H02K 21/14; H02K 1/22
See application file for complete search history.

(56) References Cited

U.S. PATENT DOCUMENTS

| | | | | |
|---|---|---|---|---|
| 2003/0193258 A1* | 10/2003 | Reiter, Jr. | .............. | H02K 1/265 310/216.004 |
| 2008/0303368 A1* | 12/2008 | Rahman | ............... | H02K 1/2766 310/156.56 |
| 2013/0134816 A1 | 5/2013 | Nagahama et al. | | |
| 2014/0062247 A1* | 3/2014 | Dorfner | ................ | H02K 15/03 310/156.56 |
| 2018/0337565 A1* | 11/2018 | Reddy | ................... | H02K 17/168 |
| 2023/0070394 A1* | 3/2023 | Fatemi | ................... | H02K 5/128 |

FOREIGN PATENT DOCUMENTS

| | | |
|---|---|---|
| JP | 2020043680 A | 3/2020 |
| JP | 2021052462 A | 4/2021 |

* cited by examiner

*Primary Examiner* — Thomas Truong
(74) *Attorney, Agent, or Firm* — Quinn IP Law

(57) ABSTRACT

A radial flux electric motor includes a stator having a radially inner stator surface and stator windings arranged thereon. The motor also includes a rotor mounted inside the stator and configured to rotate relative thereto about an axis. The rotor has a rotor core defined by a rotor outer surface and includes magnetic poles configured to generate magnetic flux and defining flux leakage zones. The motor additionally includes a selective permeability sleeve arranged circumferentially on the rotor and fixed to the rotor outer surface, thereby establishing an airgap between the sleeve and the stator. The sleeve provides reinforcement to the rotor core and to the magnetic poles and includes regions of relatively high and relatively low magnetic permeability alternating around the rotor outer surface. The regions of relatively low magnetic permeability are arranged radially outward and across from the flux leakage zones to control magnetic flux distribution in the motor.

18 Claims, 4 Drawing Sheets

SELECTIVE PERMEABILITY ROTOR SLEEVE FOR INTERIOR PERMANENT MAGNET MACHINE

INTRODUCTION

The disclosure relates to a selective permeability sleeve for a rotor of an interior permanent magnet machine.

An electric motor is a machine that converts electric energy into mechanical energy. Electric motors may be configured as an alternating current (AC) or a direct current (DC) type. An electric motor's operation is based on an electromagnetic interaction between permanent magnets and the magnetic field created by the machine's selectively energized coils. Electric motors are generally classified into two categories based on the direction of the magnetic field—axial flux motors and radial flux motors.

An interior permanent magnet (IPM) electric motor is an AC synchronous brushless machine with permanent magnets embedded in the rotor core. IPM machines are generally characterized by a favorable ratio of output torque versus the motor's physical size, as well as reduced input voltage. Electric motor torque is commonly generated by the magnetic flux linkage between the field of the rotor permanent magnets and the electro-magnetic field of the stator. IPM motors may augment such permanent magnet torque with reluctance torque which permits use of thinner rotor magnets.

SUMMARY

A radial flux electric motor includes a stator having a radially inner stator surface and stator windings arranged thereon. The electric motor also includes a rotor mounted inside the stator and configured to rotate relative thereto about a rotational axis. The rotor has a rotor core defined by a rotor outer surface and includes magnetic poles configured to generate magnetic flux and defining flux leakage zones. The electric motor additionally includes a selective permeability sleeve arranged circumferentially on the rotor and fixed to the rotor outer surface, thereby establishing an airgap between the sleeve and the stator. The selective permeability sleeve provides reinforcement to the rotor core and to the magnetic poles and includes regions of relatively high magnetic permeability and regions of relatively low magnetic permeability alternating around the rotor outer surface. The regions of relatively low magnetic permeability are arranged radially outward and across from the flux leakage zones to control magnetic flux distribution in the electric motor.

Each region of relatively high magnetic permeability may be constructed from a ferromagnetic material and each region of relatively low magnetic permeability is constructed from a paramagnetic material.

The ferromagnetic material may be ferrous steel and the paramagnetic material may be austenitic steel.

The radial flux electric motor may additionally include a dielectric layer. In such an embodiment, each region of relatively high magnetic permeability may be electrically isolated from each region of relatively low magnetic permeability by the dielectric layer.

Each of the regions of relatively low magnetic permeability may have a relative magnetic permeability of less than 10.

The selective permeability sleeve may have yield strength equal to or greater than 300 MPa and a young's modulus equal to or greater than 150 GPa.

Each magnetic pole may include at least one rotor pocket having at least one permanent magnet embedded or disposed therein and configured to generate magnetic flux. In such an embodiment, each rotor pocket may have at least a portion thereof arranged proximate to the rotor outer surface and defining a respective flux leakage zone.

The rotor core may include a structural bridge extending from at least one of the rotor pockets to the rotor outer surface. In such an embodiment, one of the regions of relatively low magnetic permeability may be arranged radially outward and across from the structural bridge.

Each magnetic pole may include neighboring permanent magnets arranged in respective neighboring rotor pockets. The rotor core may also include a structural web positioned between the neighboring rotor pockets. In such an embodiment, one of the regions of relatively low magnetic permeability may be arranged radially outward and across from the structural web.

Each region of relatively high magnetic permeability may be configured to facilitate the passage of magnetic flux from at least one magnetic pole across the airgap to the stator windings.

Each region of relatively low magnetic permeability may span an arc having a length at least twice the length of the airgap.

The number of regions of relatively low magnetic permeability may be equal to at least the number of magnetic poles.

The radial flux electric motor may be an interior permanent magnet (IPM) or a surface-mounted permanent magnet (SPM) synchronous machine.

A motor vehicle having such a radial flux electric motor as described above is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
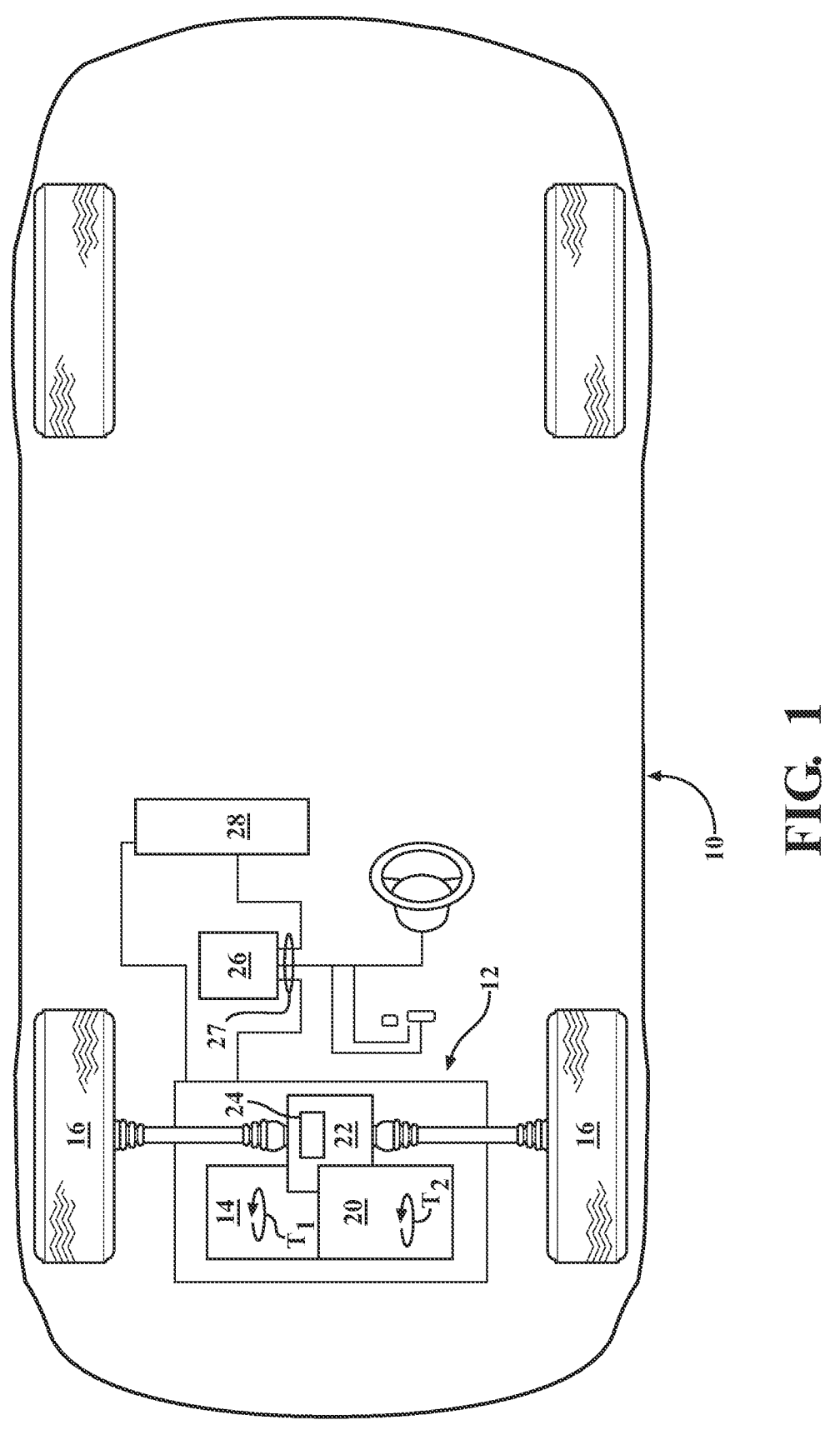
FIG. 1 is a schematic illustration of a motor vehicle having a powertrain employing a radial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to FIG. 1, a motor vehicle 10 having a powertrain 12 is depicted. The motor vehicle 10 may include, but not be limited to, a commercial vehicle, industrial vehicle, passenger vehicle, aircraft, watercraft, train, or the like. It is also contemplated that the motor vehicle 10 may be a mobile platform, such as an airplane, all-terrain vehicle (ATV), boat, personal movement apparatus, robot, and the like to accomplish the purposes of this disclosure. The powertrain 12 includes a first power-source 14 depicted as an electric motor-generator and configured to generate a first power-source torque $T_1$ (shown in FIG. 1) for propulsion of the motor vehicle 10 via driven wheels 16 relative to a road surface. The motor-generator 14 may be configured as a radial flux electric motor, where the magnetic flux is generated perpendicular to the motor's axis of rotation and the airgap between the machine's rotor and stator is arranged concentrically with the rotational axis.

As shown in FIG. 1, the powertrain 12 may also include a second power-source 20, such as an internal combustion engine configured to generate a second power-source torque $T_2$. The power-sources 14 and 20 may act in concert to power the motor vehicle 10 and be operatively connected to a transmission assembly 22. The transmission assembly 22 may be configured to transmit first and/or second power-source torques $T_1$, $T_2$ to a final drive unit 24, which in turn may be connected to the driven wheels 16. The first power-source 14, which for the remainder of the present disclosure will be referred to as a motor-generator or electric motor, may, for example, be mounted to the second power-source 20, mounted to (or incorporated into) the transmission assembly 22, mounted to the final drive unit 24, or be a stand-alone assembly mounted to the structure of the vehicle 10. As shown, the motor vehicle 10 additionally includes a programmable electronic controller 26 configured to communicate via a high-voltage BUS 27 and control the powertrain 12 to generate a predetermined amount of power-source torque (sum of $T_1$ and $T_2$), and various other vehicle systems. Motor vehicle 10 additionally includes an energy storage system 28, such as one or more batteries, configured to generate and store electrical energy for powering the power-sources 14 and 20.

Figure 2:
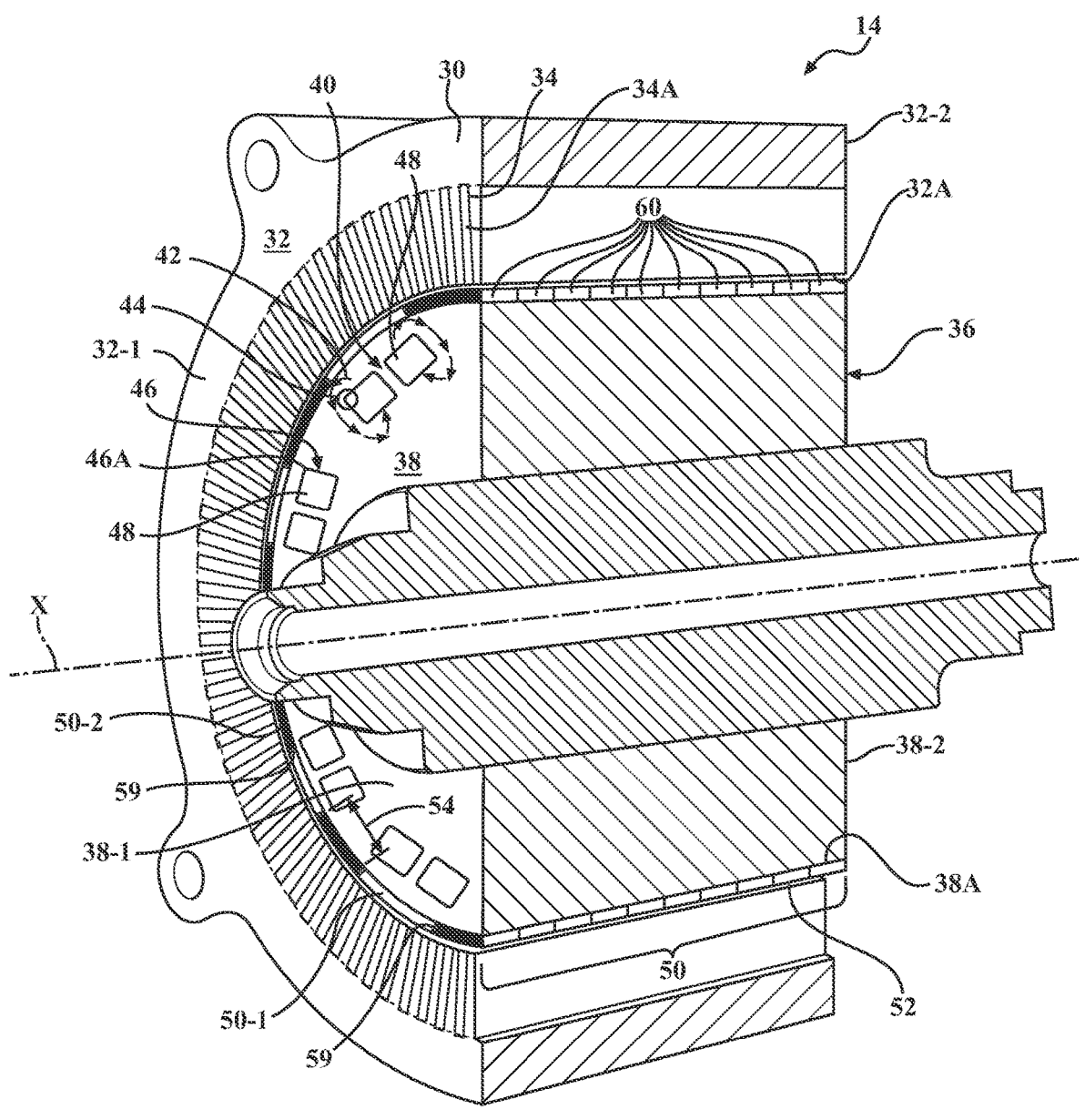
FIG. 2 is a schematic close-up partial cut-away perspective view of the radial flux electric motor-generator shown in FIG. 1, depicting a rotor mounted selective permeability sleeve including multiple adjacent rings, according to the disclosure.

FIG. 2 illustrates a general cross-section of the radial flux motor-generator 14. As shown, the motor-generator 14 includes a rotationally fixed stator 30 having a generally cylindrical core 32 and winding slots 34. As shown for example in FIG. 3B, the stator core 32 also has a radially inner stator core surface 32A. The motor-generator 14 also includes a rotor 36 defining a rotational axis X and mounted for rotation inside the stator 30. The stator 30 may include multiphase AC windings 34A arranged within the winding slots 34, wherein the windings receive multiphase AC from a power inverter to establish a rotating magnetic field exerting torque upon the rotor 36. The stator windings 34A are generally contained within the winding slots 34 with end turns of the windings extending beyond the limits of the cylindrical core 32 at axially opposite stator ends—a first end 32-1 and a second end 32-2.

The rotor 36 has a ferromagnetic rotor core 38. The rotor core 38 has axially opposite rotor core ends—a first end 38-1 and a second end 38-2—and is defined by a radially outer rotor surface 38A. The rotor core 38 may be constructed from a relatively soft magnetic material, such as laminated silicon steel. The rotor 36 also includes a plurality of magnetic poles 40, each configured to generate magnetic flux 42 and defining flux leakage zones 44. Specifically, the stacked rotor laminations may include voids forming interior pockets 46 with permanent magnets 48 disposed or embedded therein, collectively defining the magnetic poles 40. As shown in FIG. 2, each rotor pocket 46 may have at least a portion 46A arranged proximate to the rotor outer surface 38A defining a respective flux leakage zone 44. The radial flux electric motor 14 may be an interior permanent magnet (IPM) or a surface-mounted permanent magnet (SPM) synchronous machine, as understood by those skilled in the art.

As shown in FIGS. 2-6, the motor-generator 14 also includes a selective permeability sleeve 50 arranged circumferentially on the rotor 36 and fixed to, such as pressed onto, the rotor outer surface 38A. As a result, the selective permeability sleeve 50 is positioned directly across from the radially inner stator core surface 32A and thereby establishes an airgap 52 between the rotor 36 and the stator 32. The sleeve 50 is configured to provide a mechanical reinforcement to the rotor core 38 and reinforcement/retention of the magnetic poles 40. As shown in FIGS. 2-6, the sleeve 50 specifically includes regions of relatively high magnetic permeability 50-1 and regions of relatively low magnetic permeability 50-2 spaced along and alternating around the rotor outer surface 38A.

The sleeve 50 is mounted on the rotor core 38 such that each region of relatively high magnetic permeability 50-1 may pass the magnetic flux 42 from respective magnetic pole(s) 40 across the airgap 52 to the stator windings 34A. On the other hand, the regions of relatively low magnetic permeability 50-2 are arranged radially outward and across from the flux leakage zones 44 to control magnetic flux distribution in the electric motor 14. The number of regions of relatively low magnetic permeability 50-2 may be equal to at least the number of magnetic poles 40. A particular region of relatively low magnetic permeability 50-2 may be arranged radially outward and across from the rotor pocket portion 46A located at the closest proximity to the rotor outer surface 38A. As shown in FIG. 2, each region of relatively low magnetic permeability 50-2 may span an arc 54 having a length at least twice the length of the airgap 52.

Each of the regions of relatively low magnetic permeability 50-2 may have relative magnetic permeability of less than 10 and further less than 1.2. Each region of relatively high magnetic permeability 50-1 may be constructed from a ferromagnetic material and each region of relatively low magnetic permeability 50-2 may be constructed from a paramagnetic material. The ferromagnetic material may for example be ferrous steel and the paramagnetic material may be austenitic steel. The difference between the relative magnetic permeability of the ferromagnetic material and magnetic permeability of the paramagnetic material may be at least 10 and may be equal to or greater than 100,000. The resultant selective permeability sleeve 50 structure may have yield strength of at least 300 MPa and further equal to or greater than 1500 MPa and a young's modulus equal to or greater than 150 GPa to withstand the hoop stress generated by a spinning rotor 36 and provide sufficient reinforcement to the rotor core 38.

Figure 3:
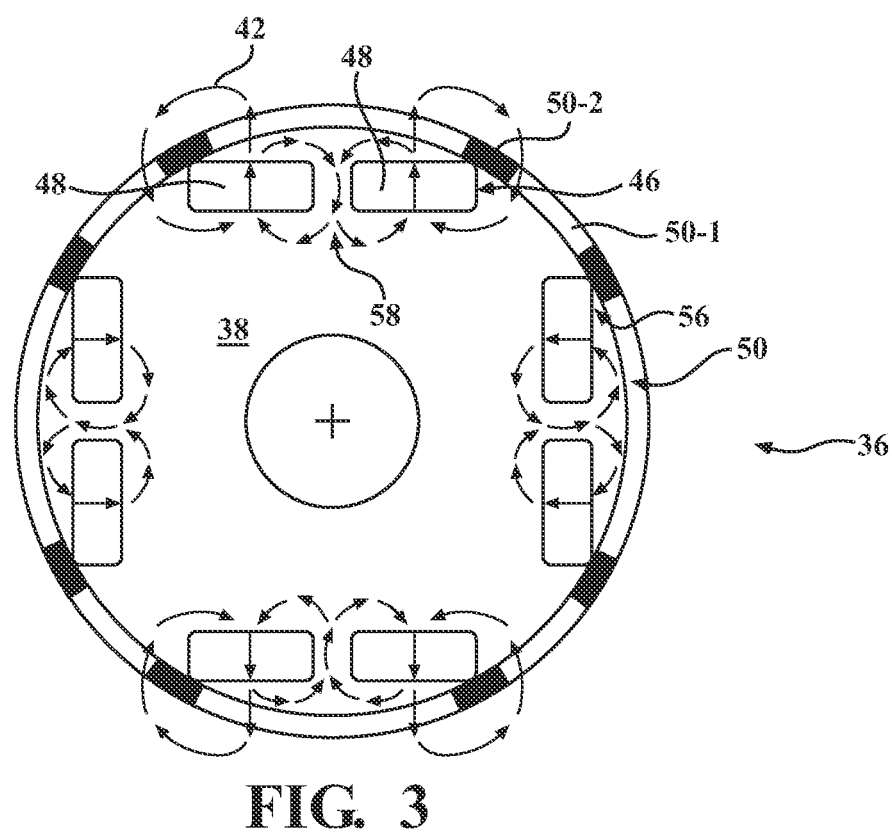
FIG. 3 is a schematic front view of an embodiment of the rotor and the selective permeability sleeve shown in FIG. 2, according to an embodiment of the disclosure.
Figure 4:
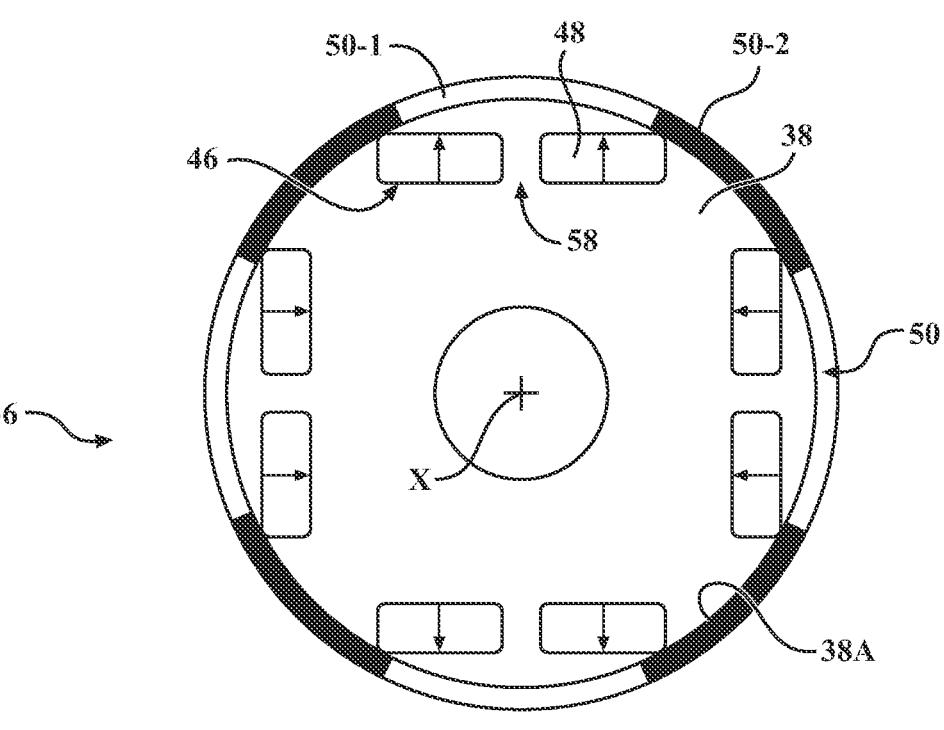
FIG. 4 is a schematic front view of another embodiment of the rotor and the selective permeability sleeve shown in FIG. 2, according to an embodiment of the disclosure.
Figure 5:
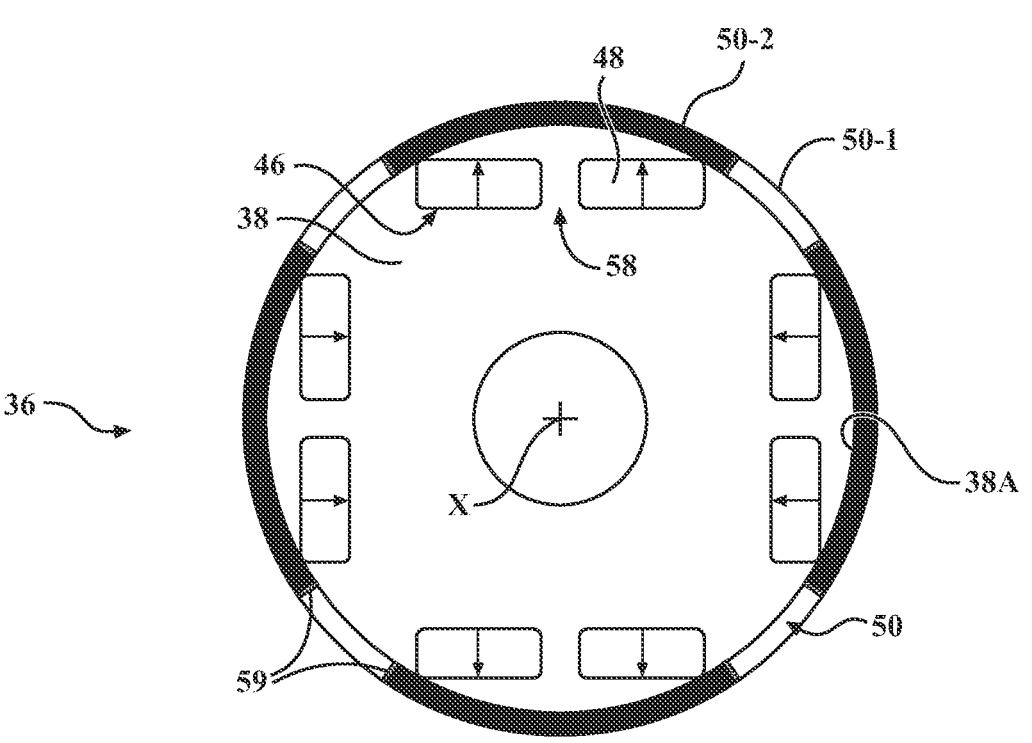
FIG. 5 is a schematic front view of another embodiment of the rotor and the selective permeability sleeve shown in FIG. 2, according to an embodiment of the disclosure.
Figure 6:
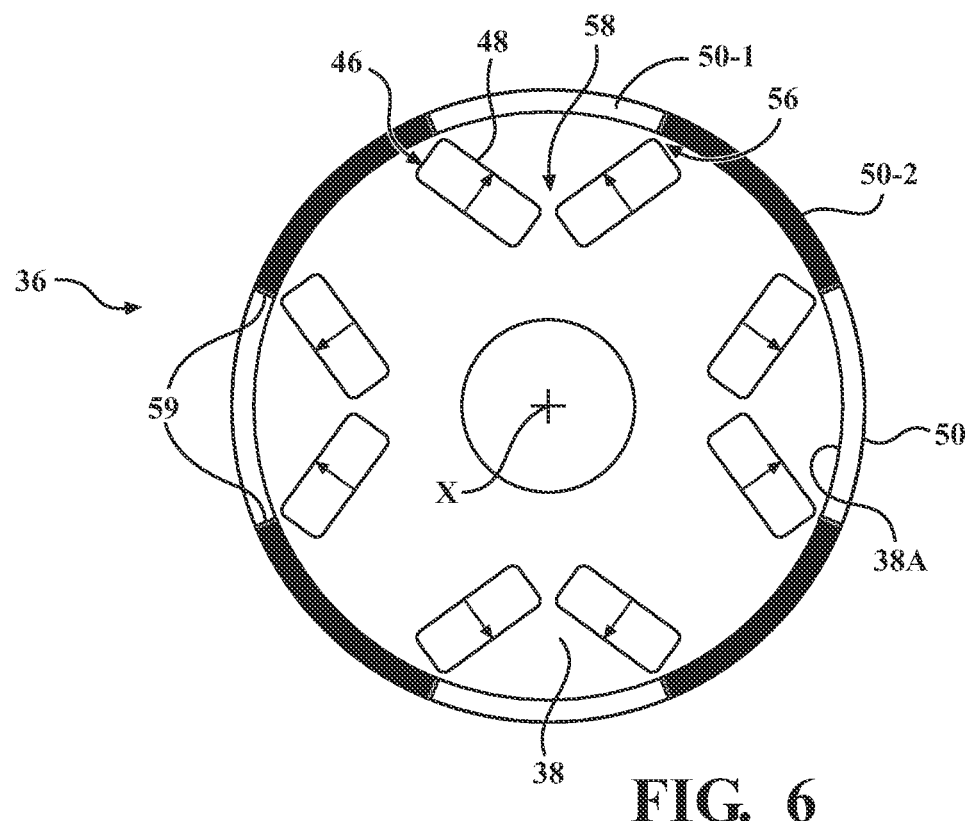
FIG. 6 is a schematic front view of another embodiment of the rotor and the selective permeability sleeve shown in FIG. 2, according to an embodiment of the disclosure.

As shown in FIGS. 3 and 6, the rotor core 38 may include structural bridges 56 extending from individual rotor pockets 46 to the rotor outer surface 38A. One of the regions of relatively low magnetic permeability 50-2 may be arranged radially outward and across from a specific structural bridge 56. Individual magnetic poles 40 may include neighboring permanent magnets 48 arranged in respective neighboring rotor pockets 46, with the rotor core including a structural web 58 positioned between the subject neighboring rotor pockets. A specific arrangement of the permanent magnets 48 may have a general "V" shape, with the structural web 58 positioned at the point of the "V", as shown in FIG. 6. A corresponding region of relatively low magnetic permeability 50-2 may be arranged radially outward and across from the structural web 58.

An alternative construction of the rotor 36 may be characterized by the absence of structural bridges extending from individual rotor pockets 46 to the rotor outer surface 38A, such that the permanent magnets 48 are not constrained by the outer rotor surface 38A. Also, the rotor core 38 may be characterized by the absence of structural webs, such that the permanent magnets 48 making up individual magnetic poles have no separating structure therebetween. In such rotor 36 structures, the sleeve 50 may be configured, i.e., designed and constructed, to withstand greater forces to retain the permanent magnets 48 within the corresponding rotor pockets 46 during operation of the electric motor 14.

With resumed reference to FIG. 2, the radial flux electric motor 14 may additionally include a plurality of dielectric separators or layers 59 arranged radially with respect to the rotational axis X. Specifically, a corresponding dielectric layer 59 may be employed to electrically isolate each region of relatively high magnetic permeability 50-1 from a neighboring region of relatively low magnetic permeability 50-2. Each dielectric layer 59 may be a coating applied to either the region of relatively high magnetic permeability 50-1 or to the region of relatively low magnetic permeability 50-2 or configured as a thin strip of material arranged therebetween. For example, each dielectric layer 59 may be configured as an organic coating, such as epoxy or varnish, or be constructed from an inorganic material, such ceramic or glass.

As shown in FIG. 2, the selective permeability sleeve 50 may include multiple adjacent rings 60, each having alternating regions of relatively high magnetic permeability 50-1 and regions of relatively low magnetic permeability 50-2. The adjacent rings 60 may be constrained or fixed together by an interference fit with the rotor core 38 or by being pressed together via rotor end plates (not shown) positioned at opposite rotor core ends 38, 38-2. Overall, the alternating regions of relatively high and relatively low magnetic permeability 50-1, 50-2 of the selective permeability sleeve 50 are arranged radially outward and across from the rotor flux leakage zones 44 to control magnetic flux distribution in the electric motor 14. Additionally, the selective permeability sleeve 50 provides mechanical reinforcement to the rotor core and retention of the rotor permanent magnets.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A radial flux electric motor comprising:
   a stator having a radially inner stator surface and stator windings arranged thereon;
   a rotor mounted inside the stator and configured to rotate relative thereto about a rotational axis, wherein the rotor has a rotor core defined by a rotor outer surface and includes magnetic poles configured to generate magnetic flux and defining flux leakage zones;
   a selective permeability sleeve arranged circumferentially on the rotor and fixed to the rotor outer surface, thereby establishing an airgap between the sleeve and the stator, wherein the sleeve provides reinforcement to the rotor core and to the magnetic poles and includes regions of relatively high magnetic permeability and regions of relatively low magnetic permeability alternating around the rotor outer surface such that the regions of relatively low magnetic permeability are arranged radially outward and across from the flux leakage zones to control magnetic flux distribution in the electric motor; and
   a plurality of dielectric layers, wherein each region of relatively high magnetic permeability is electrically isolated from each region of relatively low magnetic permeability by one of the dielectric layers.

2. The radial flux electric motor according to claim 1, wherein each region of relatively high magnetic permeability is constructed from a ferromagnetic material and each region of relatively low magnetic permeability is constructed from a paramagnetic material.

3. The radial flux electric motor according to claim 2, wherein the ferromagnetic material is ferrous steel and the paramagnetic material is austenitic steel.

4. The radial flux electric motor according to claim 1, wherein each region of relatively low magnetic permeability has a relative magnetic permeability of less than 10.

5. The radial flux electric motor according to claim 1, wherein each magnetic pole includes at least one rotor pocket having at least one permanent magnet embedded therein and configured to generate the magnetic flux, and wherein each rotor pocket has at least a portion thereof arranged proximate to the rotor outer surface and defining a respective flux leakage zone.

6. The radial flux electric motor according to claim 5, wherein the rotor core includes a structural bridge extending from at least one of the rotor pockets to the rotor outer surface and one of the regions of relatively low magnetic permeability is arranged radially outward and across from the structural bridge.

7. The radial flux electric motor according to claim 5, wherein:

the at least one permanent magnet includes neighboring permanent magnets arranged in respective neighboring rotor pockets;

the rotor core includes a structural web positioned between the neighboring rotor pockets; and one of the regions of relatively low magnetic permeability is arranged radially outward and across from the structural web.

8. The radial flux electric motor according to claim 1, wherein each region of relatively high magnetic permeability is configured to facilitate passage of the magnetic flux from at least one magnetic pole across the airgap to the stator windings.

9. The radial flux electric motor according to claim 1, wherein the airgap is defined by a length, and wherein each region of relatively low magnetic permeability spans an arc having a length at least twice the length of the airgap.

10. A motor vehicle comprising:

a radial flux electric motor configured to generate torque for propulsion of the motor vehicle, the radial flux electric motor including:

a stator having a radially inner stator surface and stator windings arranged thereon;

a rotor mounted inside the stator and configured to rotate relative thereto about a rotational axis, wherein the rotor has a rotor core defined by a rotor outer surface and includes magnetic poles configured to generate magnetic flux and defining flux leakage zones;

a selective permeability sleeve arranged circumferentially on the rotor and fixed to the rotor outer surface, thereby establishing an airgap between the sleeve and the stator, wherein the sleeve provides reinforcement to the rotor core and to the magnetic poles and includes regions of relatively high magnetic permeability and regions of relatively low magnetic permeability alternating around the rotor outer surface such that the regions of relatively low magnetic permeability are arranged radially outward and across from the flux leakage zones to control magnetic flux distribution in the electric motor; and a plurality of dielectric layers, wherein each region of relatively high magnetic permeability is electrically isolated from each region of relatively low magnetic permeability by one of the dielectric layers.

11. The motor vehicle according to claim 10, wherein each region of relatively high magnetic permeability is constructed from a ferromagnetic material and each region of relatively low magnetic permeability is constructed from a paramagnetic material.

12. The motor vehicle according to claim 11, wherein the ferromagnetic material is ferrous steel and the paramagnetic material is austenitic steel.

13. The motor vehicle according to claim 10, wherein each region of relatively low magnetic permeability has a relative magnetic permeability of less than 10.

14. The motor vehicle according to claim 10, wherein each magnetic pole includes at least one rotor pocket having at least one permanent magnet embedded therein and configured to generate the magnetic flux, and wherein each rotor pocket has at least a portion thereof arranged proximate to the rotor outer surface and defining a respective flux leakage zone.

15. The motor vehicle according to claim 14, wherein the rotor core includes a structural bridge extending from at least one of the rotor pockets to the rotor outer surface and one of the regions of relatively low magnetic permeability is arranged radially outward and across from the structural bridge.

16. The motor vehicle according to claim 14, wherein:

the at least one permanent magnet includes neighboring permanent magnets arranged in respective neighboring rotor pockets;

the rotor core includes a structural web positioned between the neighboring rotor pockets; and one of the regions of relatively low magnetic permeability is arranged radially outward and across from the structural web.

17. The motor vehicle according to claim 10, wherein each region of relatively high magnetic permeability is configured to facilitate passage of the magnetic flux from at least one magnetic pole across the airgap to the stator windings.

18. A radial flux electric motor comprising:

a stator having a radially inner stator surface and stator windings arranged thereon;

a rotor mounted inside the stator and configured to rotate relative thereto about a rotational axis, wherein the rotor has a rotor core defined by a rotor outer surface and includes magnetic poles configured to generate magnetic flux and defining flux leakage zones;

a selective permeability sleeve arranged circumferentially on the rotor and fixed to the rotor outer surface, thereby establishing an airgap between the sleeve and the stator; and a plurality of dielectric layers;

wherein:

the sleeve provides reinforcement to the rotor core and to the magnetic poles and includes regions of relatively high magnetic permeability and regions of relatively low magnetic permeability alternating around the rotor outer surface such that the regions of relatively low magnetic permeability are arranged radially outward and across from the flux leakage zones to control magnetic flux distribution in the electric motor;

each region of relatively high magnetic permeability is constructed from a ferromagnetic material and each region of relatively low magnetic permeability is constructed from a paramagnetic material; and wherein each region of relatively high magnetic permeability is electrically isolated from each region of relatively low magnetic permeability by one of the dielectric layers.

* * * * *